US 6,700,877 B1

(12) United States Patent
Lorenz et al.

(10) Patent No.: US 6,700,877 B1
(45) Date of Patent: Mar. 2, 2004

(54) METHOD AND BUS SYSTEM FOR AUTOMATIC ADDRESS ALLOCATION

(75) Inventors: Joachim Lorenz, Hemhofen (DE); Karl Weber, Altdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/485,212

(22) PCT Filed: Jul. 23, 1998

(86) PCT No.: PCT/DE98/02076

§ 371 (c)(1),
(2), (4) Date: Feb. 4, 2000

(87) PCT Pub. No.: WO99/08164

PCT Pub. Date: Feb. 18, 1999

(30) Foreign Application Priority Data

Aug. 5, 1997 (DE) .......................................... 197 33 906

(51) Int. Cl.[7] .............................................. H04L 12/28
(52) U.S. Cl. ....................................... 370/254; 370/471
(58) Field of Search ................................. 370/254, 471, 370/457; 340/825.52; 714/48

(56) References Cited

U.S. PATENT DOCUMENTS

| | | | |
|---|---|---|---|
| 5,636,342 A | * 6/1997 | Jeffries | ......................... 714/48 |
| 5,689,675 A | * 11/1997 | Buij et al. | ............. 340/825.52 |
| 5,768,277 A | 6/1998 | Ohno et al. | |
| 5,848,072 A | * 12/1998 | Prill et al. | ................... 370/471 |

FOREIGN PATENT DOCUMENTS

| | | | |
|---|---|---|---|
| DE | 37 36 081 | 5/1989 | |
| DE | 44 28 502 | 2/1996 | |
| EP | 0 173 905 | 3/1986 | |
| JP | 08 037538 | 2/1996 | |
| WO | WO 99/49397 A1 | * 9/1999 | ........... G06F/13/42 |

* cited by examiner

Primary Examiner—Salvatore Cangialosi
(74) Attorney, Agent, or Firm—Staas & Halsey LLP (57) ABSTRACT

A method for automatic address assignment is disclosed, said method being based on a distance measurement, a master (M) transmitting via the bus a preamble (P) which is received by all the slaves which are to be addressed. The slaves react to the preamble (P) by transmitting a response signal sequence (A). A slave (S2) which is located upstream, in the direction of the master (M), of a slave (S3) which transmits a response signal sequence (A) registers the response signal sequence (A) of the slave (S3) and subsequently waits for a new preamble (P). The slave (Sz) which does not register any response signal sequences (A) from other slaves is the last slave (Sz), seen from the master (M), without address allocation on the bus. This slave (Sz) switches into a state in which it is ready to receive an address-assigning telegram (T) from the master (M), with which address-assigning telegram (T) it is assigned an unambiguous address. During the next cycle of the method, the slave (Sz) which has just been assigned an address no longer reacts to the preamble (P) so that another slave evaluates the constellations at the bus in such a way that it switches into a state in which it is ready to receive the address-assigning telegram. In this way, all the slaves without an address are gradually assigned an address.

17 Claims, 5 Drawing Sheets

METHOD AND BUS SYSTEM FOR AUTOMATIC ADDRESS ALLOCATION

FIELD OF THE INVENTION

The present invention relates to a method for automatic address assignment in a bus system having a plurality of communications subscribers or a bus system having a plurality of communications subscribers which are suitable for automatic address assignment, and to the communications subscribers which can be used in the bus system and/or within the framework of the method.

The communications system here is a bus system in which no means for address assignment, for example electronic or mechanical switches, no means for signal delay, etc., are provided for the communications subscribers themselves.

BACKGROUND OF THE INVENTION

A method for automatic address assignment in which the actual communications subscribers which are connected to the bus each have means for address allocation is conventional. For example, in the automation device S7-300 from SIEMENS Aktiengesellschaft, communications subscribers which are connected to the bus have, for example, electrically active components with which it is possible to bring about a situation for the respective communications subscriber in which a signal sequence which is transmitted by a superordinate communications subscriber is represented at the respective communications subscriber in a different way than in the case of further communications subscribers which may be present on the bus. In this case, it is ensured, for example, that the signal sequence which is transmitted by the superordinate communications subscriber first reaches only as far as the first communications subscriber; this communications subscriber modifies the received signal sequence, derives its own address from it and passes on the modified signal sequence to the next communications subscriber only when the modification of the signal sequence and the derivation of the address have been terminated. The second communications subscriber on the bus adopts the same procedure.

A method for automatic address assignment is also known for a superordinate communications subscriber which has, in each case, a so-called port for communicative connection with other communications subscribers, it being possible for each of the communications subscribers to be connected to in each case one of these ports of the superordinate communications subscriber, the address of the respective communications subscriber being defined implicitly by means of the connection to the respective port. Such star-shaped connections are also referred to as point-to-point connections and can be used, for example, when connecting peripheral equipment to a personal computer.

An automatic address allocation is not currently possible in certain types of communications systems, in particular bus systems, in particular serial bus systems, in which no means for address assignment are provided for the individual communications subscribers.

In addition, owing to the topology, an address, even a default address, may occur only once in a bus system because otherwise it is impossible for the communications subscribers to be identified unambiguously, and thus unambiguous data transmission is impossible.

Furthermore, in the conventional bus systems, it is not possible for a plurality of communications subscribers to be incorporated simultaneously into the bus system. New communications subscribers which are to be added can be recognized in most cases as new communications subscribers by reference to a predefinable default address so that if a plurality of communications subscribers with identical default addresses are added simultaneously, ambiguity occurs which makes simultaneous automatic incorporation of a plurality of communications subscribers impossible. A similar problem arises also when defective communications subscribers are exchanged if a communications subscriber with an address which has already been assigned is connected to the communications system when the exchange occurs.

SUMMARY

An object of the present invention is to provide a method for automatic address assignment in a bus system having a plurality of communications subscribers and/or a bus system having a plurality of communications subscribers which are suitable for an automatic address assignment and/or the communications subscribers which can be used in the bus system and/or within the scope of the method, with which method, bus system and/or communications subscribers the abovementioned problems are avoided.

This object is achieved by providing a method for automatic address assignment in a communications system having a plurality of communications subscribers, at least one of which, referred to below as master, performs a superordinate function. The master transmits for the address assignment, a signal sequence, in the following referred to as preamble. The signal sequence is received by the remaining communications subscribers, referred to below as slaves. Each slave which has not yet been allocated an address immediately transmits a signal sequence in response to the preamble, that slave which is chronologically the last to receive the preamble detects, determined from the fact that no further actions take place in the communications system within a predefined time after the signal sequence which was transmitted by it, that, as viewed from the master, there are no further slaves without address allocation present in the communications system spatially after it subsequently switches into an operating mode B which permits an address-assigning telegram from the master to be received. The address-assigning telegram is used by this slave for address assignment. The further slaves without address allocation, which detect actions in the communications system after their own response, waiting again for the preamble of the master.

This object is also achieved by providing a communications system having a plurality of communications subscribers which are suitable for an automatic address assignment. At least one of the subscribers referred to below as master, performs a superordinate function. The master being capable of transmitting a signal sequence for address assignment, referred to below as preamble. The remaining communications subscribers, referred to below as slaves, which have not yet been allocated an address are capable of immediately transmitting a signal sequence in response to the preamble. Each slave is capable of monitoring the communications system after the reception of the preamble. At least one signal sequence which is transmitted by a slave and is intended for the other slaves is capable of being evaluated as an action in the communications system, the absence of the action in the communications system during a predefinable time period being capable of being evaluated by the respective slave to the effect that there are no further slaves without address allocation spatially after it in the communications system, with the result that the respective slave can be switched into an operating mode which permits an address-assigning telegram from the master to be received, with which address-assigning telegram the address assignment for this slave can be effected.

For the communications subscribers, the object is achieved, on the one hand, by means of a super ordinate communications subscriber, referred to below as master, which is suitable for automatic address assignment in a communications system having other communications subscribers, referred to below as slaves, the master at least being suitable for transmitting a signal sequence in order to initiate the address assignment, referred to below as preamble, for receiving a response signal sequence, which can be transmitted via one of the slaves in reaction to the preamble, and for transmitting an address-assigning telegram to the transmitter of the response signal sequence and, on the other hand, by means of a communications subscriber, referred to below as slave, which is provided for use in a communications system with automatic address assignment, which can be effected by a superordinate communications subscriber, referred to below as master, in which case said master can be operated in a configuration mode, in which it is suitable for immediately transmitting a signal sequence in response to a preamble which can be transmitted by the master, and for monitoring the communications system after the reception of the preamble, at least one response signal sequence which is transmitted by another slave and is intended for the slave being capable of being evaluated as an action in the communications system, and the absence of the action in the communications system during a predefinable time period being capable of being evaluated by the slave to the effect that, as viewed from the master, there are no further slaves without address allocation spatially after it in the communications system, and the slave can subsequently be switched into an operating mode, and can be operated in the reception mode which at least permits an address-assigning telegram from the master to be received, with which address-assigning telegram the address assignment for the slave can be effected.

If the number of slaves which have not yet been assigned an address is detected, or can be detected, by reference to the number of response signal sequences transmitted by the slaves, a situation in which the method for automatic address assignment is carried out precisely the number of times necessary for all the slaves to be allocated an unambiguous address can be brought about particularly easy.

If the master transmits a preamble again after a slave has been assigned an address, if it is clear that slaves which have not yet been allocated an address are still present in the communications system, it is ensured that each slave which has not yet been allocated an address is allocated an address.

If the master transmits a preamble again at predefinable times or in a predefinable time pattern while the communications system is operating, it is ensured that new communications subscribers which are added are allocated an address even while the communications system is operating.

If the addresses of the slaves are assigned in an ascending or descending sequence corresponding to the distance from the master, each address of a slave implicitly contains an information item which relates to a relative position and which can be evaluated, for example, within the scope of a fault locating operation. If a slave with the address X can be accessed and, on the other hand, the slave with the address X+1 can no longer be accessed, it is, for example, clear that the communications system, for example the bus line, between the slave with the address X and the slave with the address X+1 must be faulty, damaged or broken.

If it is possible to generate a mapping of the topology of the slaves connected to the bus by reference to the addresses of the individual slaves, this information can be made available, for example, to a planning and design tool so that a geographical process map can be generated if the communications system is used, for example, within the scope of an automation project for controlling and/or monitoring a technical process.

Further advantages and inventive details emerge from the following description of an exemplary embodiment, in which.

The invention is concerned with an automatic address assignment in a communications system. In the exemplary embodiment, the profibus is treated as the communications system by way of example. However, the present invention is in no way restricted to the profibus but instead can also advantageously be used in other bus systems of the above-mentioned type, in particular in the case of bus systems with bus lines in which no subscriber-related, delaying elements are provided, in which therefore signal sequences which are transmitted via the bus are present, as it were, simultaneously at the respective communications subscribers and therefore, starting from a transmitter, a signal sequence cannot be influenced by a first subscriber in such a way that a following subscriber perceives a modified signal sequence.

Until now, an automatic assignment of addresses of the communications subscribers has not been possible with the profibus because a signal sequence which is transmitted by the superordinate communications subscriber, the master, is present, as it were, simultaneously at all the slaves. If this signal sequence were provided for the address assignment, all the slaves would react to one and the same signal sequence in the same way; consequently, it would be impossible to make an unambiguous distinction.

The address assignment according to the invention, which is explained further below for the profibus by way of example, is based on a distance measurement on the medium, and the transmission medium and therefore the signal propagation velocities do not play any role here with the result that cables, optical waveguides and plugs which comply with EN50170 can be used.

A communications system with a plurality of communications subscribers can be put into operation automatically using the method according to the invention. It is possible to provide all the communications subscribers which are provided and prepared for the automatic address assignment with a subscriber address and to incorporate them into the bus without collisions and without crashing or reconfiguration of the communications system.

In addition, the method according to the invention can be used to allocate the subscriber address to the geographical site of installation.

Figure 1:
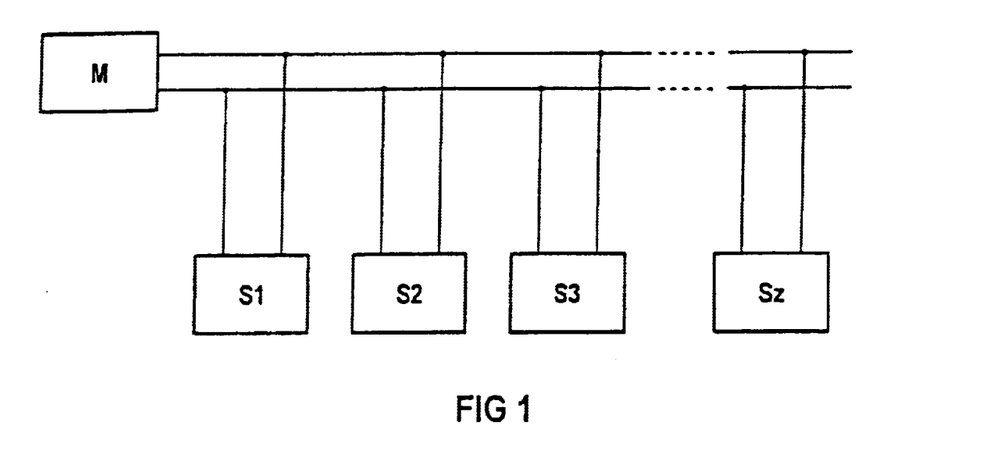
FIG. 1 shows a simplified structure of a communications system with a superordinate communications subscriber, master, and subordinate slaves.

FIG. 1 shows a simple representation of the structure of a communications system. A superordinate communications subscriber M, the master M, and at least one further communications subscriber S1, S2, . . . , referred to below as slave S1, S2, . . . , is connected to the communications system.

A signal sequence which is transmitted by the master M arrives in most cases at all the slaves, S1, S2, . . . connected to the bus. A dedicated communication between a master M and a slave S1, S2, . . . and/or if appropriate between two slaves S1, S2, . . . between one another is possible only after the slaves S1, S2, . . . have been assigned an unambiguous address by means of which it is respectively possible for them to detect that a signal sequence, which, as described, arrives in most cases at each communications subscriber S1, S2, . . . , is intended precisely for a specific communications subscriber M, S1, S2, . . .

For this reason, the method according to the invention for automatic address assignment, in which therefore there is at least one slave S1, S2, . . . which has not yet been allocated an address and therefore this at least one slave S1, S2, . . . which cannot be addressed unambiguously by means of an address run in an, as it were, "protocol-free" fashion.

As is explained further below in detail, the slaves S1, S2, . . . which have been prepared for the application of the method according to the invention have, for this purpose, transmitting and reception means which are used during the protocol-free operation, which is referred to below as configuration mode K. Furthermore, you also have, of course, the customary transmitting and reception means which [lacuna] used in normal reception mode in which it is possible to transmit and receive signal sequences which are sufficient for the bus protocol which is defined for the respective transmission medium. This normal reception mode is designated below as operating mode B.

During the automatic address assignment, during which the slaves S1, S2, . . . which have not yet been assigned an address are therefore in the configuration mode K, the master, which initiates the method according to the invention for automatic address assignment, seizes the bus in order to transmit a signal sequence and, if appropriate, monitor the reception of response signal sequences. The slaves S1, S2, . . . , which are not tied to a bus protocol during the operation in the configuration mode K, detect received signal sequences in accordance with their internal wiring which is suitable for executing the method according to the invention, and furthermore, if appropriate, they transmit their own signal sequences in reaction to the received signal sequences without, in doing so, having to take into account possible further data traffic on the communications medium.

The master M, in the exemplary embodiment the profibus master M, transmits, for the purpose of automatic address assignment, a specific signal sequence P, the preamble P, over the communications system, the profibus, and at the same time monitors the possible arrival of responses A in reaction to this preamble P.

The slaves S1, S2, . . . which have been provided for the automatic address assignment and which have previously not been assigned an unambiguous address remain, until the assignment of an unambiguous address, in the configuration mode K which permits reception, detection and immediate reaction to the preamble P.

The slave S1 which is located spatially closest to the master M with respect to the communications line receives and detects the preamble P first in chronological terms and responds immediately with a minimum delay by transmitting a response signal sequence A.

In the meantime, the signal P, the preamble P, runs on to the next slave S2. The slave Sz, which is furthest away from the master M along the bus line, receives the preamble P last in chronological terms. This last slave Sz also directly transmits a response signal sequence A in response to the preamble P.

All the slaves S1, S2, . . . which are located spatially before this last slave Sz have already received the preamble P chronologically before this slave Sz and detect, by way of the fact that after they themselves have responded to the preamble P with their response signal sequence A, a response signal sequence A—namely the response signal sequence A of the slave Sz which is furthest away—also runs on the bus at a later time, that, spatially after them, a further communications subscriber Sz without an address is also connected to the communications system.

The communications subscribers S1, S2, . . . which are located in front of this last slave Sz detect therefore that they themselves are not the last slave on the communications line, whereas the last slave Sz continues to monitor the bus for a specific, predefinable time after the transmission of its response signal sequence A, and [lacuna], by virtue of the fact that no further actions take place on the bus—i.e. that is to say, for example, no further response signal sequence A is transmitted over the bus—during the passage of this time, that it is actually the last communications subscriber (without address guideline) on the bus.

The configuration mode K is divided up here, as explained above, into three mutually independent phases, the preamble P being detected in the first phase P1, the response signal sequence A being transmitted in the second phase P2 in response to the preamble P, and the bus being monitored in the third phase P3, each action on the bus, which action is detected in this third phase P3, having the effect that, for security reasons, the respective slave S1, S2, . . . evaluates this situation to determine whether further slaves S1, S2, . . . without address guideline are located spatially after it, and consequently drops again into the first phase P1 of the configuration mode K which permits the preamble P to be received and detected.

After it is unambiguously clear for the respective slave Sz that it is actually the last communications subscriber on the bus, the slave Sz switches from its present mode of operation, the configuration mode K, which permits the preamble P to be detected and the response signal sequence A to be subsequently transmitted, into an operating mode B which permits an address-assigning telegram T to be received from the master M, with which address-assigning telegram T the address assignment for this slave S1, S2, . . . takes place.

The remaining slaves S1, S2, . . . without address allocation remain in the configuration mode K, with the result that they cannot evaluate, or even register, the address-assigning telegram T of the master M, and wait for a new preamble P of the master M.

During the next cycle of the method, the slave Sz which has just been assigned an address and which is, of course, now in the normal operating mode B, no longer reacts to the preamble P and will consequently no longer react to the preamble P, in particular no longer react with a response signal sequence A, even if a preamble P is sent over the bus by the master M. For this reason, according to the method described above the slave S1, S2, . . . which immediately precedes the slave Sz which has been assigned an address will evaluate the constellations on the bus when a new preamble P is received, in order to determine that it is itself the last communications subscriber without address assignment on the bus, and will appropriately switch into the normal operating mode B, which in turn permits the address-assigning telegram T to be received.

The sequence of the method according to the invention is explained below with reference to the illustration in FIG. 2, which shows by way of example a location/time diagram for a bus system with four slaves S1, S2, S3 . . . Sz:

The communications subscribers, the master M and the slaves S1, S2, S3 . . . Sz are represented on the abscissa of FIG. 2. Time values T0, T1 . . . T11 are represented on the ordinate.

At the time T0, the master M transmits the preamble P. The preamble P arrives at the slave S1 at the time T1. The slave S1 transmits, at the time T2, a response signal sequence A1 in reaction to the preamble P, which response signal sequence A1 propagates on the bus, see FIG. 1, both in the direction of the further communications subscribers S2, S3 . . . Sz, and in the direction of the master M. Furthermore, the preamble P is of course also transmitted on the bus in the direction of the further slaves S2, S3 . . . Sz.

At the time T3, the slave S2 receives the preamble P which is transmitted by the master M, and in the process the response signal sequence A1 of the slave S1 which arrives later is not detected or not evaluated by the slave S2 because the bus is not monitored by the respective slave S1, S2, . . . until the third phase P3 of the configuration mode K. The slave S2 reacts, at the time T4, to the received preamble P with the transmission of the response signal sequence A2, which propagates in turn in the direction of the preceding communications subscribers M, S1 and in the direction of the further slaves S3 . . . Sz, and in the process very largely overlaps (A . . . 2) with the response signal sequence A1 transmitted by the first slave S1.

At the time T5, the preamble reaches the slave S3. Approximately at this time, the response signal sequence A1 transmitted by the slave S1 reaches the master M. At the time T6, the slave S3 reacts to the received preamble P by transmitting the response signal sequence A3, which in turn propagates both in the direction of the further slaves Sz and in the direction of the preceding communications subscribers M, S1, S2 (A3, A . . . 3).

At the time T7, the signal sequence A2 transmitted by the slave S2 reaches the slave S1, which, after the transmission of its own response signal sequence A1 has monitored the bus from the time T2 to the time T7 in the third phase P3 of the configuration mode K to determine whether there are actions, and detects the response signal sequence A2 transmitted by the slave S2 as an action on the bus so that it is thus clear to the slave S1 that it is itself not the, viewed from the master M, last communications subscriber on the communications medium. The slave S1 subsequently drops back into the first phase P1 in the configuration mode K, which phase P1 permits renewed reception, detection and the reaction to a preamble P transmitted by the master M.

At the time T8, the signal sequence A3 transmitted by the slave S3 reaches the slave S2 which also evaluates this—by analogy with the situation just described—as an action on the bus and waits again for a preamble P.

At the time T9, the response signal sequence A2 transmitted by the slave S2 reaches the master M.

At the time T10, the response signal sequence A3 transmitted by the slave S3 reaches the slave S1, but said slave S1 is already in the first phase P1 of the configuration mode K, and consequently does not react to the response signal sequence A3.

At the time T8, the preamble P has already reached the last slave Sz. The latter reacts at the time T9 by transmitting the response signal sequence Az. At the time T11, said response signal sequence Az reaches the slave S3 located before the last slave Sz, which slave S3 subsequently switches back—precisely like the slaves S1 and S2 have already done—into the first phase P1 of the configuration mode K, with the result that it is thus also clear to the slave S3 that it is itself not the, viewed from the master M, last communications subscriber on the communications medium. At the time T12, the response signal sequence Az transmitted by the last slave Sz arrives at the master M.

Because the slave Sz is the last communications subscriber on the bus, no further communications subscriber receives the preamble P after said slave Sz. Consequently, the response signal sequence Az which runs from the last slave Sz in the direction of the master M over the bus is the last response signal sequence A triggered with the current preamble P. The last slave Sz therefore itself does not receive any response signal sequence A during the current cycle of the method according to the invention. After the transmission of its own response signal sequence Az, the last slave Sz, which monitors the bus during a predefinable time during the third phase P3 of its configuration mode K, does not detect any actions, in particular any response signal sequences A, on the bus. (The third phase P3 of the configuration mode K is indicated for the respective slaves S1, S2, . . . in FIG. 2 with the vertical arrow in each case). After the predefinable time period has passed, the last slave Sz evaluates the fact that response signal sequences A do not arrive from possible further communications subscribers to mean that it is itself the, viewed from the master M, last communications subscriber on the bus. The slave Sz consequently switches out of the configuration mode K into the operating mode B.

Figure 2:
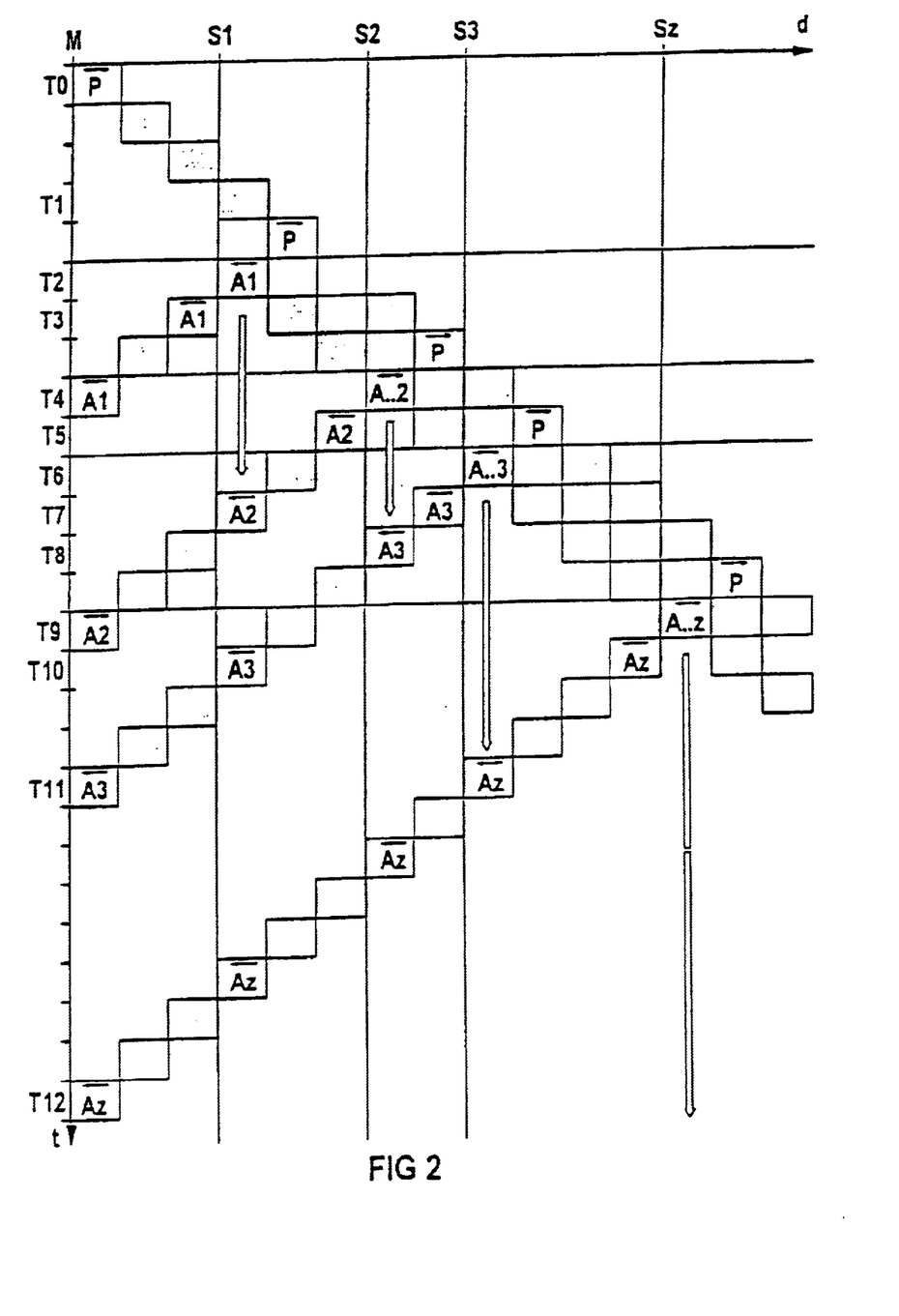
FIG. 2 shows a schematic representation of the processes during the execution of the automatic address assignment method according to the invention.

The master M registers the arrival of the response signal sequences A, the response signal sequence A of the slave S1 arriving, in accordance with FIG. 2 for example, at the time T4, that of the slave S2 arriving, in accordance with FIG. 2 for example, at the time T9, that of the slave S3 arriving, in accordance with FIG. 2 for example, at the time T11 etc. If the master M does not detect any further arrival of a response signal sequence A during a time period which can also be predefined, it is clear that the last response signal sequence A to have arrived is the response signal sequence Az of the communications subscriber Sz which, viewed from the master M, is the furthest away. In this context, the predefinable time period during which the master M monitors the arrival of response signal sequences A is determined essentially by the maximum possible extent of the communication medium.

The distance between the last communications subscriber Sz and the master M can be determined by reference to the time difference between the transmission of the preamble at the time T0 and the time Tx—according to FIG. 2 for example the time T12—of the arrival of the last response signal sequence Az. As a function of this distance and/or as a function of the total number of slaves S1, S2, . . . without address assignment present on the communications medium, an unambiguous address is assigned to the respective last communications subscriber Sz.

This is carried out by means of an address-assigning telegram T which is transmitted by the master M and which is not evaluated by the other slaves without address allocation S1, S2, . . . which have dropped back into the first phase P1 of the configuration mode K, but is received and evaluated by the respective last communications subscriber which is then switched into the operating mode B after the termination of the third phase P3 of the configuration mode K. This fact is no longer illustrated in FIG. 2.

The address-assigning telegram T is defined here in such a way that possible slaves with address allocation which are already present on the communications medium do not react to this address-assigning telegram T.

In this way, the master M can gradually assign addresses to all the slaves S1, S2, . . . on the bus according to the above-described method in accordance with the invention. Here, the addresses of the slaves S1, S2, . . . are assigned, for example, in an ascending or descending order corresponding to the distance from the master M, in which case, for example when there is a descending order, that slave S1, S2, . . . , which is the first to switch itself into a state of readiness for the reception of the address-assigning telegram T during the first cycle of the method according to the invention is assigned, as address, a predefinable starting value which is successively incremented whenever the method is carried out again. However, if the addresses are assigned in an ascending order corresponding to the distance from the master M, for example, either that slave S1, S2, . . . , which is the first to switch itself into a state of readiness for the reception of the address-assigning telegram T is assigned, as starting address, a predefinable value which is decremented whenever the method is carried out again, or the predefinable value is formed on the basis of the response signal sequences A transmitted by the slaves S1, S2, . . . when the method according to the invention is first carried out, the number of slaves S1, S2, . . . , which have not yet been assigned an address being capable of being derived from said response signal sequences A.

Figure 3:
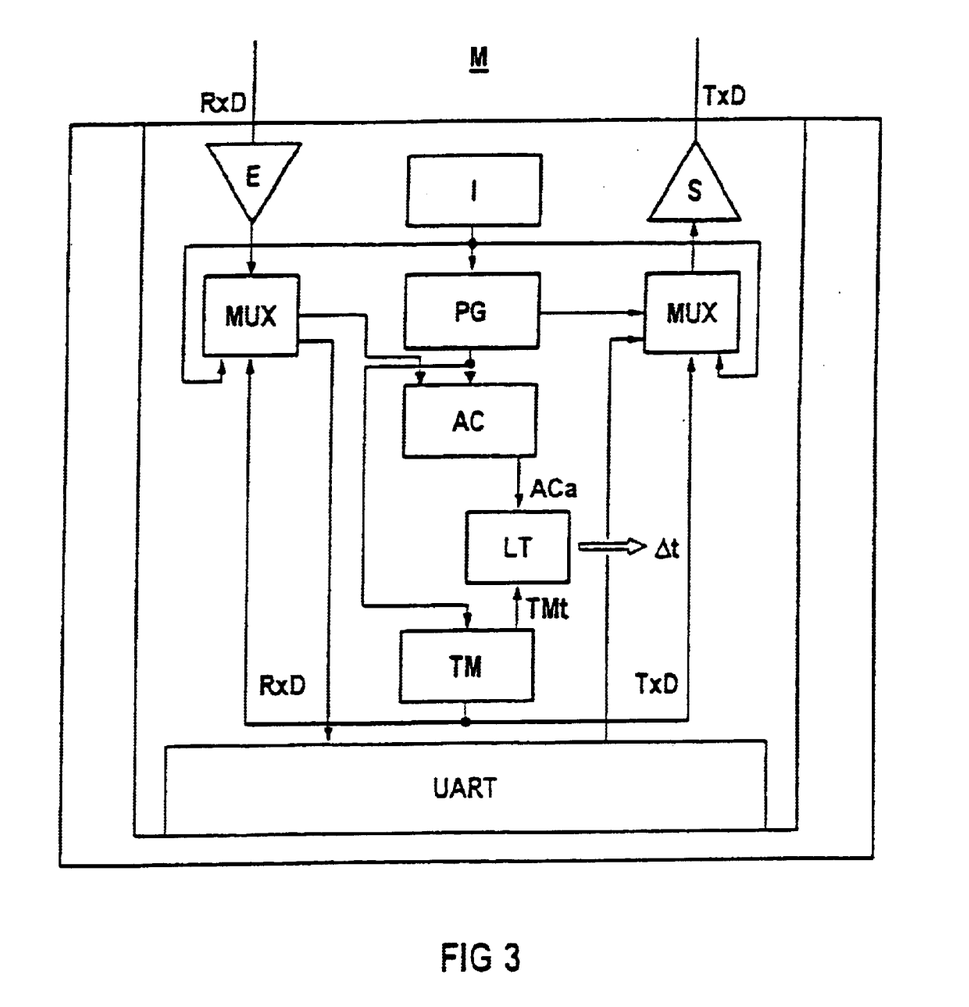
FIG. 3 shows a block circuit diagram of the master.

In order to carry out the method according to the invention, the communications subscribers, the master M and the slaves S1, S2, . . . are configured according to the invention in the following way:

The master M has, according to FIG. 3, a transmission channel S and a reception channel E. The data TxD which are to be transmitted are transmitted via the transmission channel S and the received data RxD are transmitted over the reception channel. In order to transmit the preamble P, the master M has a preamble generator PG. The preamble P passes via an output of the preamble generator PG to the transmission-channel-end multiplexer MUX. The transmission of the preamble P is initiated by an activation/initialization logic I. The activation/initialization logic I initially sets the two multiplexers MUX in such a way that the preamble generator PG with the transmission channel S and the reception channel E is connected to a device (activity controller) with which actions on the bus are monitored and detected.

After the transmission of the preamble P, the preamble generator PG activates the activity controller AC; at the same time, a timer TM is started. If data are then received on the reception channel E after the transmission of the preamble P, these data pass owing to the setting, described above, of the multiplexer MUX to the activity monitor AC, which subsequently triggers a signal ACa and buffers the received signal in a latch LT. The time which passes between the transmission of the preamble P and the detection of an action on the bus—within the scope of the method according to the invention, that is to say usually the detection of the response signal sequence A,—can be determined by reference to the time signal TMt supplied in each case by the timer TM.

However, because the response signal sequences A may overlap, or may not be unambiguously distinguished owing to the respective sampling frequency of the master M, the chronological occurrence in the last trailing edge of the response signal sequences A is relevant for the distance measurement.

After the expiry of a predefinable time period, the timer TM causes both the reception-channel-end and the transmission-channel-end multiplexer MUX to switch over so that the transmission line S and the reception line E are connected to the interface module UART in a manner known per se.

From the time difference t it is thus possible to determine, in each case using the signal propagation velocity on the communications medium which is used, the spatial distance between the master M and a slave S1, S2, . . . which is bringing about an action on the bus. With a signal propagation time of 4.2 ns/m in copper (Cu), a signal takes 8.4 ns per meter traveled from the transmission to the reception of the response.

Usually, a profibus plug is provided with an LRC combination as a filter against faults, for example reflections. This combination constitutes a line with a length of approximately 1 m. Given a minimum distance of 0.5 m between the slaves S1, S2, . . . which is also required for technical reasons, the signal propagation time from the master to the next possible slave S1, S2, . . . in copper is 1.5 4.2 ns=6.3 ns.

Until the response reaches the master M again, 2 6.3 ns, and thus approximately 12.6 ns, pass. A sampling frequency of approximately 100 MHz is therefore sufficient for sampling and measuring.

The address which is to be assigned to the respective slave S1, S2, . . . with the address-assigning telegram T can thus be expressed as a function of the distance in accordance with the principles explained above. Because there must be a minimum distance between two adjacent slaves S1, S2, . . . , which distance must be, by way of example, for example 1.0 m, given a time difference t—for example (2 2.5 m 4.2 ns/m)=21.0 ns t (2 3.5 m 4.2 ns/n)=29.4 ns—between the transmission of the preamble P and the detection of the last trailing edge of the response signal sequence or sequences A, it is ensured that an address is to be assigned for a slave S1, S2, . . . which is located at a distance of between 2.5 m and 3.5 m from the master M, that is to say consequently at the, viewed from the master M, third possible position on the bus.

In the case of the numerical example treated above, the address "3", for example, can be assigned for the slave, in which case the address then corresponds directly to the position on the bus, and the address can thus be evaluated directly as an information item relating to position.

However, it is equally possible for the slaves S1, S2,. . . , as further described above, to be numbered in an ascending or descending order and to be assigned in each case an address which corresponds to this numbering. Thus, for example a slave S1 at a distance of 5 m from the master M has the address "1", a slave S2 at a distance of 7 m from the master has the address "2" and a slave S3 at a distance of 12 m from the master has the address "3". In this case, the master M advantageously manages a lookup table LUT from which an allocation between the assigned addresses and the time differences t determined during the address assignment can be obtained; LUT=[(1; 5 m), (2; 7 m), (3; 12 m)]. In this case, the information item relating to position in the lookup table LUT can be obtained at the position which is defined by the respective address. Thus, it is also possible for slaves S1, S2, . . . which are added later to perform automatic addressing and to determine the information item relating to position. A newly added slave S4 at a distance of 9 m from the master M can, without renumbering the slaves S1, S2, S3 which have already been addressed, not be incorporated into a bus with an address which ascends monotonously in relation to the distance from the master; instead, the next free address "4" is assigned to the newly added slave S4, in which case, however, by reference to the propagation time difference t whose distance from the master M can be determined unambiguously, with the result that the information item relating to position is available again by means of the lookup table LUT=[(1; 5 m), (2; 7 m), (3; 12 m), (4; 9 m)].

This information item relating to position can be made available to a planning and design tool so that a geographical process map can be generated.

Figure 4:
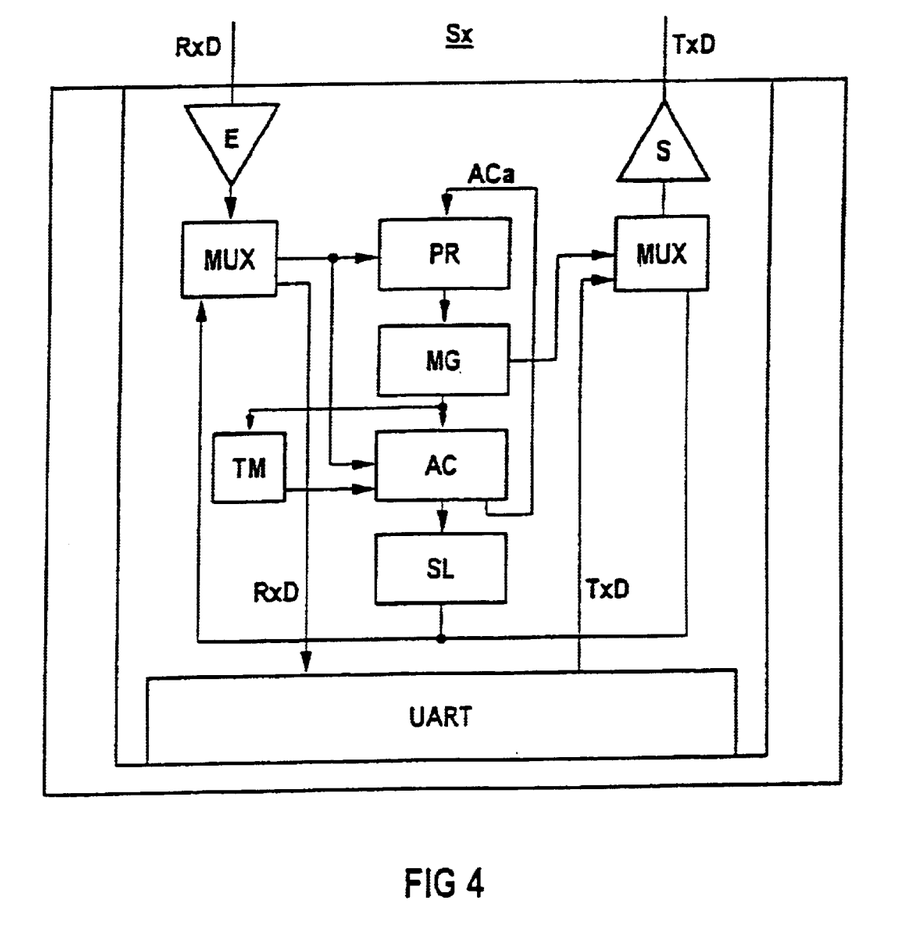
FIG. 4 shows a block circuit diagram of the slave and FIG. 5 shows a flowchart relating to the processes during the address assignment according to the invention for the slave.

According to FIG. 4, the slave S1, S2 . . . Sx also has a transmission channel S and a reception channel E. Data TxD which are to be transmitted and data RxD which are received via the reception channel E are transmitted via the transmission channel S. A multiplexer MUX is respectively arranged both in the transmission-end and in the reception-end channels. The two multiplexers MUX are initially set by a switching logic SL in such a way that a pattern generator MG for generating, for example, the response signal sequence A is connected to the transmission line S. An activity monitor AC which is specific for the slave Sx is connected to the reception channel E. Furthermore, in the setting of the reception-channel-end multiplexer MUX which is brought about in this way the reception channel E is also connected to a device for pattern recognition PR.

If a preamble P arrives at the slave Sx via the reception channel E, the device for pattern recognition PR, referred to below as preamble detector PR, detects this preamble P and activates the pattern generator MG, which feeds a response signal sequence A into the transmission channel S. When it transmits the response signal sequence A, the pattern generator MG activates the activity monitor AC of the slave Sx; at the same time, a timer TM is triggered. If the activity monitor AC registers actions on the reception channel E, it generates a signal ACa which activates the preamble detector PR again so that the slave Sx can react again to a preamble P (return from the third phase P3 of the configuration mode K to the first phase P1).

On the other hand, if the activity monitor AC registers no actions on the bus during a predefinable time period whose expiry is signaled by the timer TM, the configuration mode K is terminated for this slave Sx. The switching logic SL is activated and it switches over both the reception-channel-end and the transmission-channel-end multiplexers MUX in such a way that the reception channel E and the transmission channel S are connected directly to the interface module UART, with the result that the slave Sx is capable of receiving ordinary telegrams, in particular the address-assigning telegrams T, from the master M; the slave Sx is now in the operating mode B.

As long as a slave S1, S2, . . . is unparametrized, that is to say it has therefore not yet been assigned an address, it is in the configuration mode K in which, during the first phase P1 of the configuration mode K a preamble detector PR monitors the reception channel E, while the transmission channel S is connected to a bit pattern generator MG.

If the preamble detector PR detects a preamble P free of errors, the bit pattern generator MG generates, during the second phase P2 of the configuration mode K, the response signal sequence A for the master M without delay.

If the slave S1, S2, . . . receives no further signal for a specific, predefinable time during the subsequent, third phase P3 of the configuration mode K, it is thus clear that it is that slave S1, S2, . . . which is spatially furthest away from the master M, and is thus the last communications subscriber without address allocation on the transmission medium.

Figure 5:
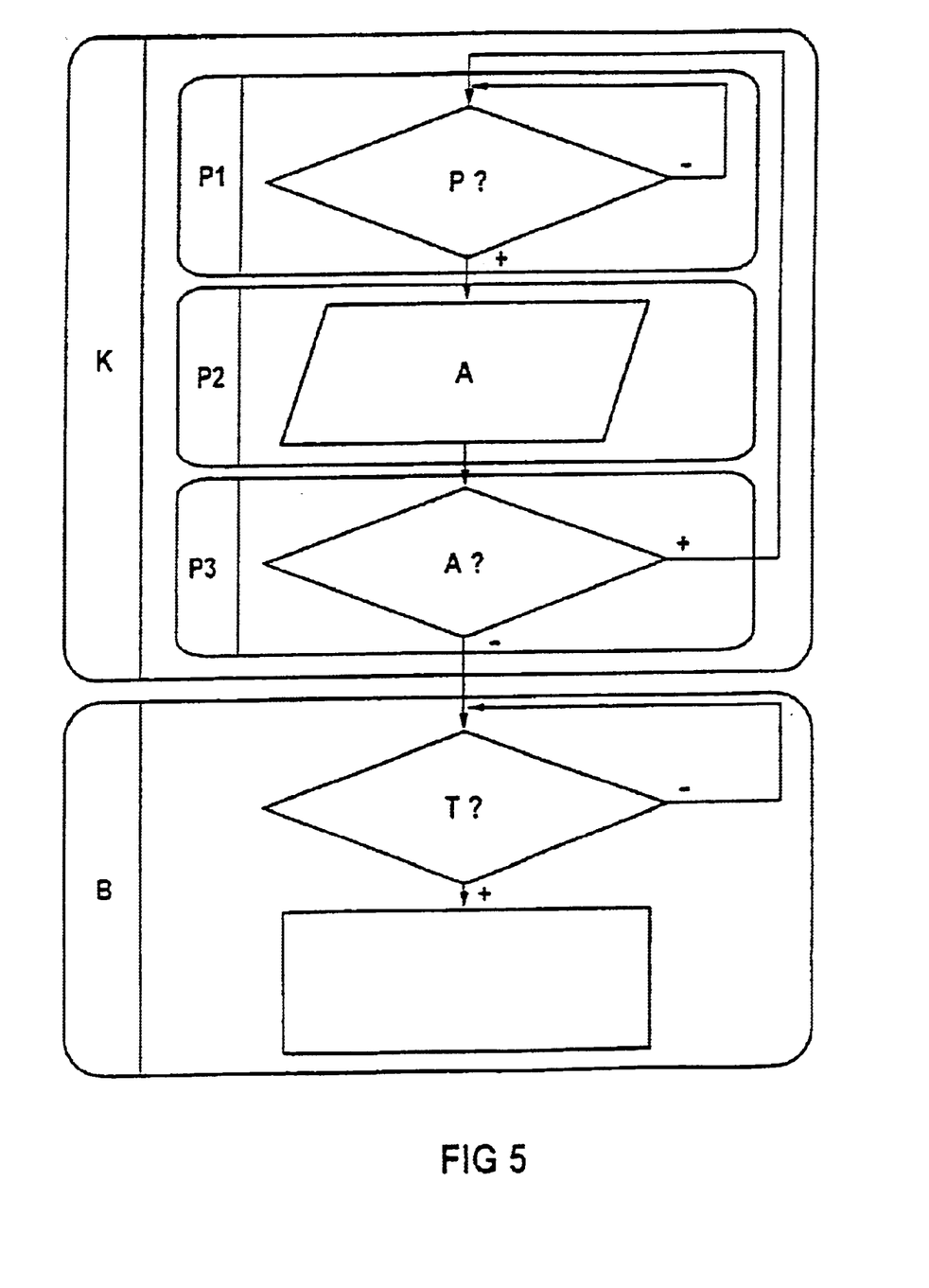

In the configuration mode K, the switching-over from one phase P1, P2, P3 into the next phase P1, P2, P3 is possible only if the chronologically preceding phase P1, P2, P3 has reliably been terminated. It is possible to switch over into the operating mode B starting from the configuration mode K only if all three phases P1, P2, P3 of the configuration mode K are reliably terminated in the expected order. FIG. 5 illustrates once more in summarized fashion the chronological sequence of the various modes and phases which a slave S1, S2, . . . runs through during the sequence of the method according to the invention.

A slave S1, S2, . . . , which is to be newly allocated to a communications system, which therefore has not yet been allocated an address by means of which it can be addressed unambiguously, is initially in the configuration mode K. The configuration mode K can be divided into three phases which follow one another chronologically. During the first phase P1, the slave S1, S2, . . . monitors the communications medium to determine whether a preamble P occurs; represented in FIG. 5 as "P?". As long as no preamble P is detected, the slave S1, S2, . . . remains in the first phase P1 of the configuration mode K. On the other hand, if the preamble P is detected, the response signal sequence A is transmitted in response to the preamble P during the second phase P2 of the configuration mode K; represented in FIG. 5 as "A". After the transmission of the response signal sequence A, the slave S1, S2, . . . monitors, during a predefinable time period in the third phase P3 of the configuration mode K, the bus to determine whether a response signal sequence A which has been transmitted by another communications subscriber occurs; represented in FIG. 5 as "A?". If a response signal sequence A is detected during the third phase P3, the slave S1, S2, . . . drops back again into the first phase P1 of the configuration mode K. On the other hand, if no response signal sequence A is detected during the predefinable time period—in which case the chronological component in the representation according to FIG. 5 is not taken into account—the system switches out of the configuration mode K over into the operating mode B. The operating mode B makes it possible to receive the address-assigning telegram T from the master M; represented in FIG. 5 as "T?". When the address-assigning telegram T is received, an unambiguous address can be assigned to the respective slave S1, S2, . . . , by means of which address said slave can be addressed during the normal operation in the operating mode B and can thus send and receive telegrams using the bus protocol defined for the communications system; represented in FIG. 5 only schematically by the "black box" after the reception of the address-assigning telegram T.

The normal cycle of parametrizing a slave (baud rate search, parametrizing etc.) is carried out using the telegrams received during normal operation—usually directly after the assignment of an address.

The signal sequences which are used within the scope of the method according to the invention, that is to say, for example, the preamble P or the response signal sequence A, must be selected in such a way that they do not adversely affect the normal communications mode and can be reliably detected as a preamble P or as a response signal sequence A.

In conclusion, the present invention can be summarized in brief as follows: a method which is based on a distance measurement is specified for automatic address assignment, a master M transmitting over the bus a preamble P which is received by all the slaves S1, S2, . . . which are to be addressed. The slaves S1, S2, . . . react to the preamble P) by transmitting a response signal sequence A. A slave S2 which is located, in the direction of the master M, upstream of a slave S3 which transmits a response signal sequence A, registers the response signal sequence A of the slave S3 and subsequently waits for a new preamble P. The slave SZ which does not register any response signal sequences A from other slaves S1, S2, . . . is the, viewed from the master M, last slave Sz without address allocation the bus. This slave Sz switches to a state in which it is ready to receive an address-assigning telegram T from the master M, with which address-assigning telegram T it is assigned an unambiguous address. During the next cycle of the method, the slave Sz which has just been assigned an address no longer reacts to the preamble P, with the result that another slave S1, S2, . . . evaluates the constellations on the bus in such a way that it switches itself to a state in which it is ready to receive the address-assigning telegram T. In this way, all the slaves S1, S2, . . . without an address are gradually assigned one.

What is claimed is:

1. A method for automatic address assignment in a communications system having a plurality of subscribers, at least one of the plurality of subscribers being a master which performs a superordinate function, others of the plurality of subscribers being slaves, the method comprising:

transmitting, by the master, a preamble for the address assignment, the preamble including a specific signal sequence;

receiving, by the slaves, the transmitted preamble;

immediately transmitting a respective response to the preamble by each of the slaves which have not yet been allocated an address, the response including a response signal sequence;

detecting, by one of the slaves which is chronologically last to receive the preamble, that the one of the slaves is a spatially last one of the slaves without address allocation;

detecting that no further actions take place in the communications system within a predefined time after one of the slaves has transmitted the respective response;

switching of the one of the slaves into a reception mode to permit an address-assigning telegram from the master to be received;

receiving the address-assignment telegram from the master by the one of the slaves;

addressing the one of the slaves using the address-assignment telegram; and waiting for the preamble from the master by the slaves which have not yet been allocated an address, each of which detects actions in the communications system after transmitting the respective response.

2. The method according to claim 1, further comprising:

detecting a number of the slaves which have not been allocated an address as a function of a number of the responses transmitted by the slaves.

3. The method according to claim 1, further comprising:

transmitting the preamble again by the master if the communications system still comprises the slaves which have not yet been allocated an address.

4. The method according to claim 1, further comprising:

while the communications system is operating, transmitting the preamble again by the master at least one of: i) predefinable times, and ii) in a predefinable time pattern.

5. The method according to claim 1, further comprising:

assigning addresses to the slaves in one of an ascending and descending sequence corresponding to a distance from the master.

6. The method according to claim 1, further comprising:

generating a mapping of a topology of the slaves in the communications system as a function of addresses of the individual slaves.

7. A communications system having a plurality of communications subscribers for an automatic address assignment, comprising:

a monitor;

a master performing a superordinate function, and comprising an arrangement to transmit a preamble for the address assignment, the preamble being a specific signal sequence; and a plurality of slaves which have not yet been allocated an address, where each of the plurality of slaves transmits a respective signal sequence in response to the preamble, comprises the monitor to monitor the communication system after receiving the preamble, and evaluates at least one of the respective signal sequence as an action in the communication system, and an absence of the action in the communications system during a predefinable time period indicative that no further slaves without address allocation are spatially after the one of the slaves in the communications system, wherein the last of the slaves switches into a normal reception mode to receive an address-assigning telegram from the master to effect the address assignment.

8. The communications system according to claim 7, wherein the master detects a number of slaves which have not yet been allocated the address as a function of a number of the response signal sequences transmitted by the slaves.

9. The communications system according to claim 7, wherein during operating, the master transmits the preamble at least one of: i) at predefinable times, and ii) in a predefinable time pattern.

10. The communications system according to claim 7, wherein the master assigns addresses to the slaves in one of an ascending and descending sequence as a function of a distance from the master.

11. The communications system according to claim 7, further comprising:

a mapping generator generating a mapping of a topology of the slaves present in the communication system as a function of the addresses of the slaves.

12. A superordinate communications subscriber for automatic address assignment in a communication system having other communication subscribers, the superordinate subscriber being a master, the other communication subscribers being slaves, comprising:

a transmitter transmitting a preamble to initiate the address assignment, the preamble being a signal sequence;

a receiver receiving a response signal sequence transmitted by one of the slaves as a function of the preamble; and an arrangement transmitting an address-assigning telegram for address assignment as a function of the received response signal.

13. The superordinate communications subscriber according to claim 12, further comprising:

a fourth arrangement detecting a number of response signal sequences transmitted by the slaves.

14. The superordinate communications subscriber according to claim 12, wherein the first arrangement transmits the preamble again if the communications system includes slaves which have not yet been allocated an address.

15. The superordinate communications subscriber according to claim 12, wherein the master assigns addresses to the slaves in one of an ascending and descending sequence as a function of distance from the master.

16. The superordinate communications subscriber according to claim 12, further comprising:

a map generator generating a mapping a topology of the slaves in the communications systems as a function of the addresses of the slaves.

17. A slave communications subscriber for use in a communications system with automatic address assignment which is effected by a master superordinate communications subscriber, comprising:

a first arrangement for operation in a configuration mode;

a transmitter immediately transmitting a response signal sequence in response to a receipt of a preamble transmitted by the master;

a monitor monitoring the communications system after receiving the preamble;

a receiver receiving an address-assigning telegram from the master when the slave switches into the configuration mode, an address assignment being effected as a function of the address-assigning telegram; and an evaluation arrangement evaluating at least one response signal sequence transmitted by another slave as an action in the communications system, the evaluation arrangement further evaluating an absence of the action in the communications system during a predefinable time period as an indication that there are no further slaves without address allocation spatially after the slave in the communications system, the slave switching into the configuration mode using the first arrangement in the absence of the action.

\* \* \* \* \*